(12) United States Patent
Cesa Klein

(10) Patent No.: US 7,543,052 B1
(45) Date of Patent: Jun. 2, 2009

(54) AUTOMATIC NETWORK TRAFFIC DISCOVERY AND CLASSIFICATION MECHANISM INCLUDING DYNAMIC DISCOVERY THRESHOLDS

(75) Inventor: Anne Cesa Klein, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 939 days.

(21) Appl. No.: 10/744,268

(22) Filed: Dec. 22, 2003

(51) Int. Cl.
*G06F 15/173* (2006.01)

(52) U.S. Cl. ...................................... 709/224; 709/223

(58) Field of Classification Search ................. 709/223, 709/224
See application file for complete search history.

(56) References Cited

U.S. PATENT DOCUMENTS

| | | | |
|---|---|---|---|
| 5,802,106 A | 9/1998 | Packer | |
| 6,018,516 A | 1/2000 | Packer | |
| 6,038,216 A | 3/2000 | Packer | |
| 6,046,980 A | 4/2000 | Packer | |
| 6,078,953 A * | 6/2000 | Vaid et al. | 709/223 |
| 6,115,357 A | 9/2000 | Packer | |
| 6,205,120 B1 | 3/2001 | Packer | |
| 6,285,658 B1 | 9/2001 | Packer | |
| 6,412,000 B1 | 6/2002 | Riddle | |
| 6,647,412 B1 * | 11/2003 | Strandberg et al. | 709/223 |
| 6,975,941 B1 * | 12/2005 | Lau et al. | 701/213 |
| 2002/0055998 A1 * | 5/2002 | Riddle et al. | 709/224 |
| 2002/0099854 A1 * | 7/2002 | Jorgensen | 709/249 |
| 2002/0143939 A1 * | 10/2002 | Riddle et al. | 709/224 |
| 2003/0046581 A1 * | 3/2003 | Call et al. | 713/201 |
| 2003/0088529 A1 * | 5/2003 | Klinker et al. | 706/3 |
| 2005/0114541 A1 * | 5/2005 | Ghetie et al. | 709/232 |
| 2005/0249497 A1 * | 11/2005 | Haran et al. | 398/58 |
| 2006/0031407 A1 * | 2/2006 | Dispensa et al. | 709/219 |
| 2007/0245165 A1 * | 10/2007 | Fung | 713/320 |
| 2008/0181248 A1 * | 7/2008 | Haran et al. | 370/412 |

* cited by examiner

*Primary Examiner*—Patrice Winder
*Assistant Examiner*—Karen C Tang
(74) *Attorney, Agent, or Firm*—Baker Botts L.L.P.

(57) ABSTRACT

Methods, apparatuses and systems directed to an automatic network traffic discovery and classification mechanism that includes dynamically adjusted traffic discovery thresholds. In one implementation, the dynamic discovery thresholds are adjusted based on analysis of one or more operational parameters associated with network traffic discovery, and/or network traffic characteristics. The present invention in one implementation can be configured to dynamically adjust one or more thresholds or range limits that affect the behavior of the automatic traffic classification mechanism, such as the rate at which new traffic classes are added to a traffic classification database. One implementation of the present invention minimizes the user intervention often required with the use of static traffic discovery thresholds.

26 Claims, 8 Drawing Sheets

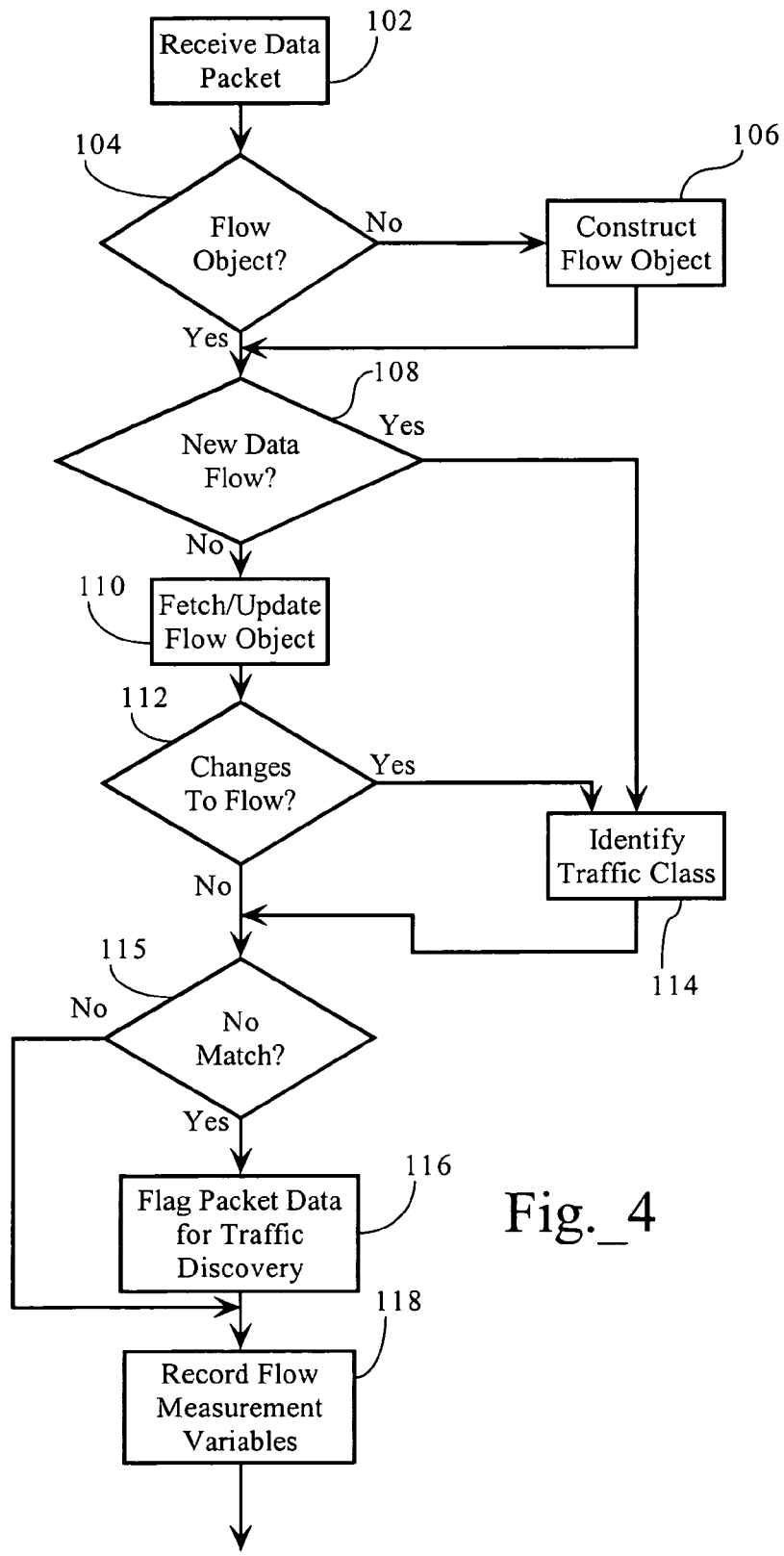
Fig._4

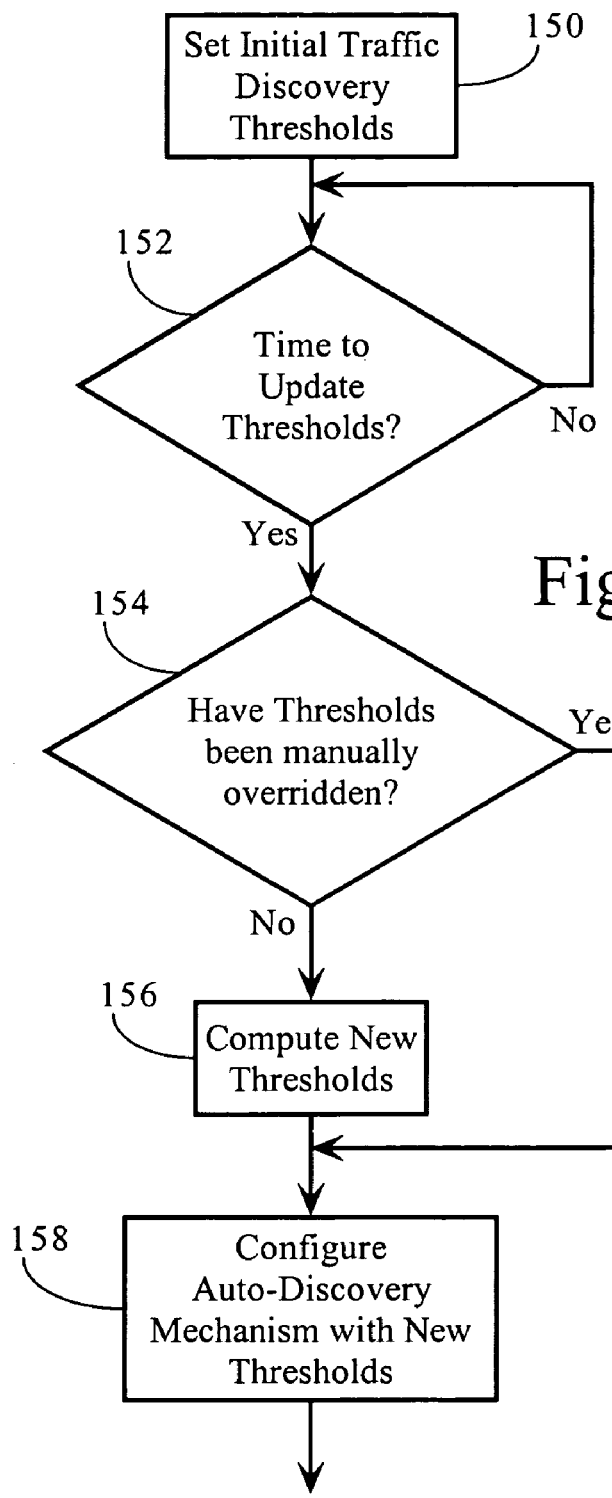
Fig._5

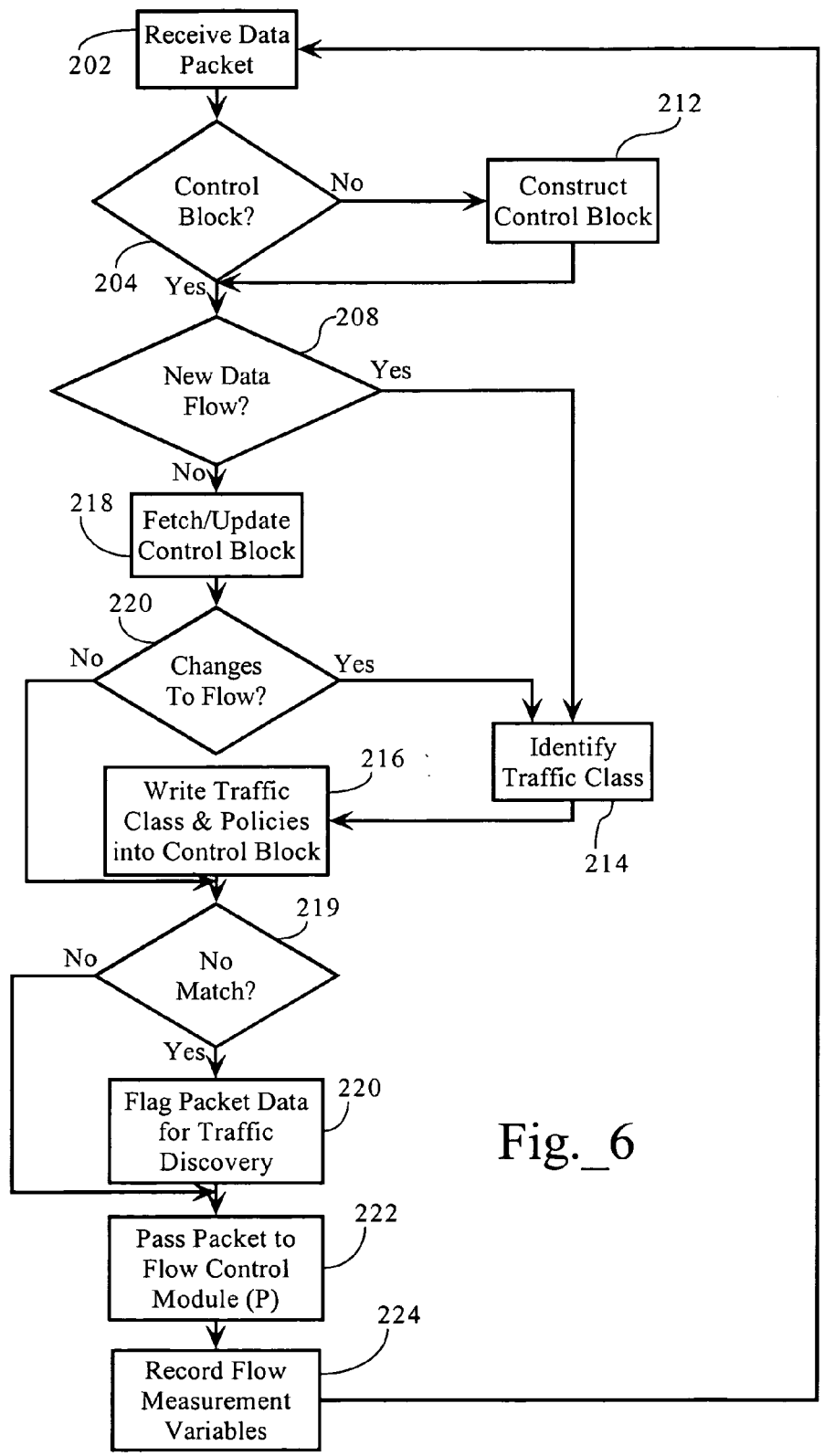
Fig._6

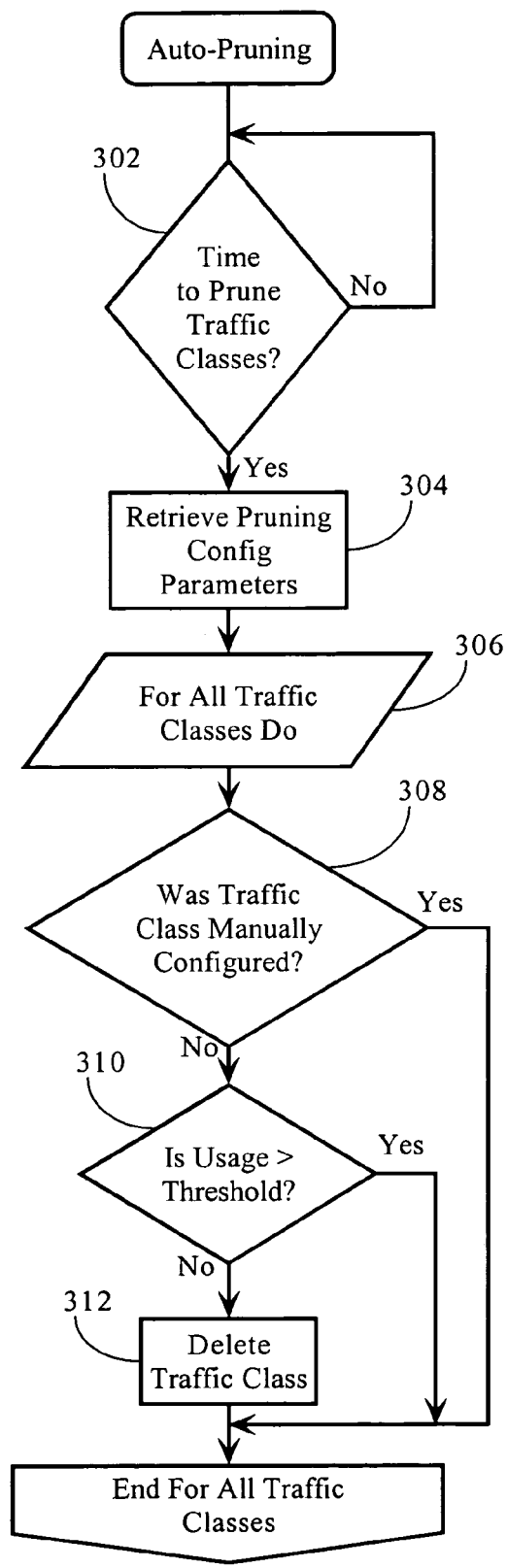
Fig._7

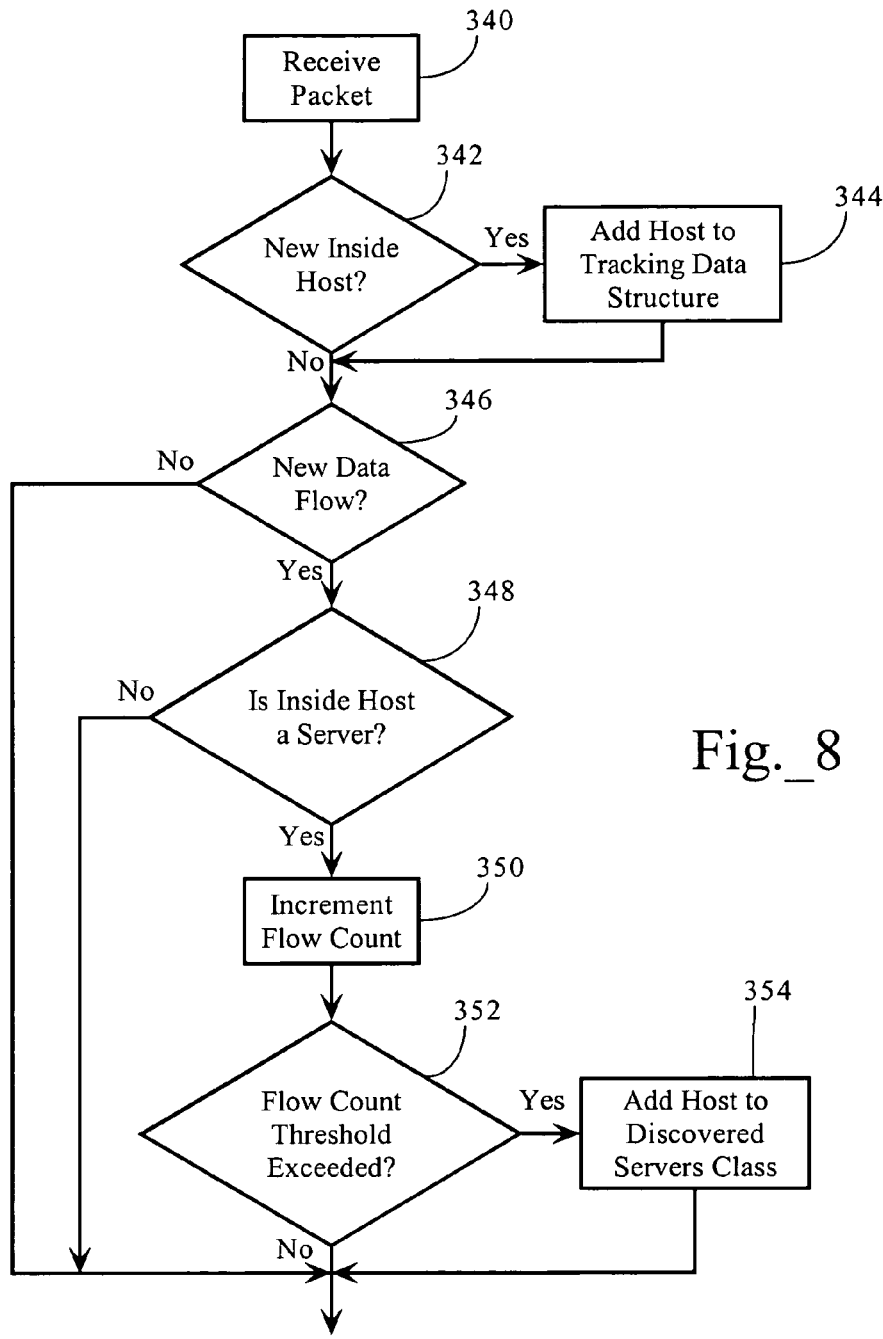
Fig._8

AUTOMATIC NETWORK TRAFFIC DISCOVERY AND CLASSIFICATION MECHANISM INCLUDING DYNAMIC DISCOVERY THRESHOLDS

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism."

FIELD OF THE INVENTION

This present invention relates to digital packet data networks, and particularly to management of network bandwidth based on information ascertainable from multiple layers of the Open Systems Interconnection (OSI) reference model. It is particularly useful in conjunction with bandwidth allocation mechanisms employing traffic classification in a packet-switched network environment, as well as in network traffic monitoring, security and/or routing systems.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic type. For example, U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user). In addition, certain bandwidth management devices allow administrators to define a partition hierarchy by configuring one or more partitions dividing the access link and further dividing the parent partitions into one or more child partitions.

To facilitate the implementation, configuration and management tasks associated with bandwidth management and other network devices including traffic classification functionality, various traffic classification configuration models and data structures have been implemented. For example, various routers allow network administrators to configure access control lists (ACLs) consisting of an ordered set of access control entries (ACEs). Each ACE contains a number of fields that are matched against the attributes of a packet entering or exiting a given interface. In addition, each ACE has an associated action that indicates what the routing system should do with the packet when a match occurs. ACLs can be configured to accomplish or facilitate a variety of tasks, such as security, redirection, caching, encryption, network address translation, and policy routing. Once configured by an administrator, the routing system compiles the ACL into a hash table to expedite the took up process during operation of the system.

As discussed in the above-identified patents and patent applications, identification of traffic types associated with data flows traversing an access link involves the application of matching criteria to various characteristics of the data flows. Such matching criteria can include source and destination IP addresses, port numbers, MIME types, application-specific attributes in packet payloads, etc. After identification of a traffic type corresponding to a data flow, a bandwidth management device can associate and subsequently apply a bandwidth utilization control (e.g., a policy or partition) to the data flow. Accordingly, a traffic class to be useful for controlling network bandwidth, or simply for monitoring bandwidth usage, should generally correspond to network traffic types commonly found traversing modern networks. Useful traffic classes include network traffic associated with different applications, such as Citrix®, database applications, accounting applications, email, file transfer, web browsing, and the like. The configuration of such traffic classes, however, requires detailed knowledge of the technical aspects or characteristics of each kind of network traffic (such as protocol identifiers, port numbers, etc.) in order to configure these traffic classes. Configuration of such traffic classes, however, can be quite complex and time-consuming, and often requires an extensive knowledge base of known network traffic types beyond the purview of a typical network administrator.

To that end, U.S. Pat. No. 6,412,000 discloses methods for automatically classifying network traffic based upon information gathered from multiple layers in a multi-layer protocol network. The method disclosed in this patent allows for a network traffic monitoring system that analyzes real traffic traversing a given network and automatically produces a list of "found" or "discovered" traffic. These technologies allow network administrators to install a network appliance at a strategic point in the network, for example, and run it to automatically discover what new applications may be present on the network. In addition, U.S. Pat. Nos. 6,412,000 and 6,457,051 disclose methods and system that automatically classify network traffic according to a set of classification attributes. As these patents teach, the traffic classification configuration can be arranged in a hierarchy, where classification of a particular packet or data flow traverses a network traffic classification tree until a matching leaf traffic class, if any, is found. Such prior art classification trees are data structures reflecting the hierarchical aspect of traffic class relationships, wherein each node of the tree represents a traffic class and includes a set of attributes or matching rules characterizing the traffic class. The traffic classification, at each level of the hierarchy, determines whether the data flow or packet matches the attributes of a given traffic class node and, if so, continues the process for child traffic class nodes down to the leaf nodes. In certain modes, unmatched data flows map to a default traffic class. Furthermore, as U.S. Pat. No. 6,591,299 teaches, newly discovered traffic types or classes are added to the traffic classification hierarchy. In addition, U.S. patent application Ser. No. 09/198,051, incorporated by reference herein, discloses automatic assignment of bandwidth utilization controls for discovered traffic classes.

The automatic traffic discovery mechanisms described in the above-identified patents and patent applications generally apply static discovery thresholds. For example, a minimum number of data flows corresponding to a particular traffic type must be encountered within a given time window for a traffic class to be added to the traffic class configuration. In one implementation, different discovery thresholds can be applied to different traffic types. For example, if a given traffic type is well known, e.g., HTTP, FTP, SMTP, it is added to a traffic class configuration after only one data flow is encountered; otherwise, the threshold can be set to an arbitrary value, for example, eleven uses with not more than one minute between any two uses.

Current traffic discovery mechanisms, however, operate under a one-size-fits-all approach; that is, the same set of discovery thresholds for new traffic class discovery are applied to all units (e.g., traffic monitoring and/or bandwidth management devices) in all configurations, and in all deployment scenarios. In some situations, new traffic classes are not discovered quickly enough; in other situations, where the volume of traffic that flows through the unit is significant, traffic discovery can only be used in short bursts and subsequent cleanup of the resulting traffic class configuration is required to remove the classes in which the network administrator does not have any interest. For example, use of the current automatic traffic discovery mechanisms can create a multitude of noise classes, given the vast array of applications that can potentially traverse a given network. These noise traffic classes can come from false positives, applications that only run once and never again, low level traffic, and applications that are valid but not of interest to the network administrator. Unfortunately, if a network administrator deletes one of these discovered traffic classes it will most likely be rediscovered and again added to the traffic class configuration. The foregoing circumstances can lead to the creation of large, unwieldy traffic classification configurations, or worse yet, the filling of the traffic class configuration memory space such that no further traffic classes (useful or otherwise) can be discovered. Beyond disabling automatic traffic discovery, there is no known solution to this problem in bandwidth management or traffic monitoring devices except to manually reset system variables, based on trial and error, until the traffic discovery unit functions as desired. Indeed, the circumstances described above often requires periodic intervention by the network administrator. For example, an exemplary work flow given current automatic traffic discovery methodologies is as follows: 1) a network administrator turns automatic traffic discovery on, causing the unit to discover traffic classes and add them to a traffic class configuration; 2) the network administrator turns off the automatic traffic discovery mechanism and deletes unwanted traffic classes from the configuration; and 3) the network administrator repeats the above steps as he or she believes necessary.

In light of the foregoing, a need in the art exists for methods, apparatuses and systems that automatically discover network traffic classes, but reduce the need for user intervention. Embodiments of the present invention substantially fulfill this need.

SUMMARY OF THE INVENTION

The present invention provides methods, apparatuses and systems directed to an automatic network traffic discovery and classification mechanism that includes dynamically adjusted traffic discovery thresholds. In one implementation, the dynamic discovery thresholds are adjusted based on analysis of one or more operational parameters associated with network traffic discovery, and/or network traffic characteristics. The present invention in one implementation can be configured to dynamically adjust one or more thresholds or range limits that affects the behavior of the automatic traffic classification mechanism, such as the rate at which new traffic classes are added to a traffic classification database. One implementation of the present invention minimizes the user intervention often required with the use of static traffic discovery thresholds.

Still further, some implementations of the present invention include other user-configurable functionality to tailor operation of, and thereby enhance, the usability of the automatic traffic discovery module 139. For example, in one implementation, the traffic discovery functionality may be configured to specifically exclude re-discovery of selected traffic classes. Other implementations of the present invention monitor the activity associated with discovered traffic classes and delete inactive traffic classes from the traffic classification database. In one implementation, the traffic discovery functionality appends or tags discovered traffic classes with metadata characterizing the circumstances surrounding discovery of the traffic classes.

DESCRIPTION OF THE DRAWINGS

FIG. 4 is a flow chart diagram providing a method, according to an embodiment of the present invention, directed to the processing of packets in a traffic monitoring device.

FIG. 5 is a flow chart diagram showing a method, according to an embodiment of the present invention, directed to periodic updates to one or more automatic traffic discovery thresholds.

FIG. 6 is a flow chart diagram providing a method directed to enforcing bandwidth utilization controls on data flows.

FIG. 7 is a flow chart diagram showing a method, according to an implementation of the present invention, directed to pruning inactive classes from a traffic classification database.

FIG. 8 is a flow chart diagram illustrating a process flow, according to an implementation of the present invention, directed to discovering servers associated with unclassified data flows.

DESCRIPTION OF PREFERRED EMBODIMENT(S)

Figure 1:
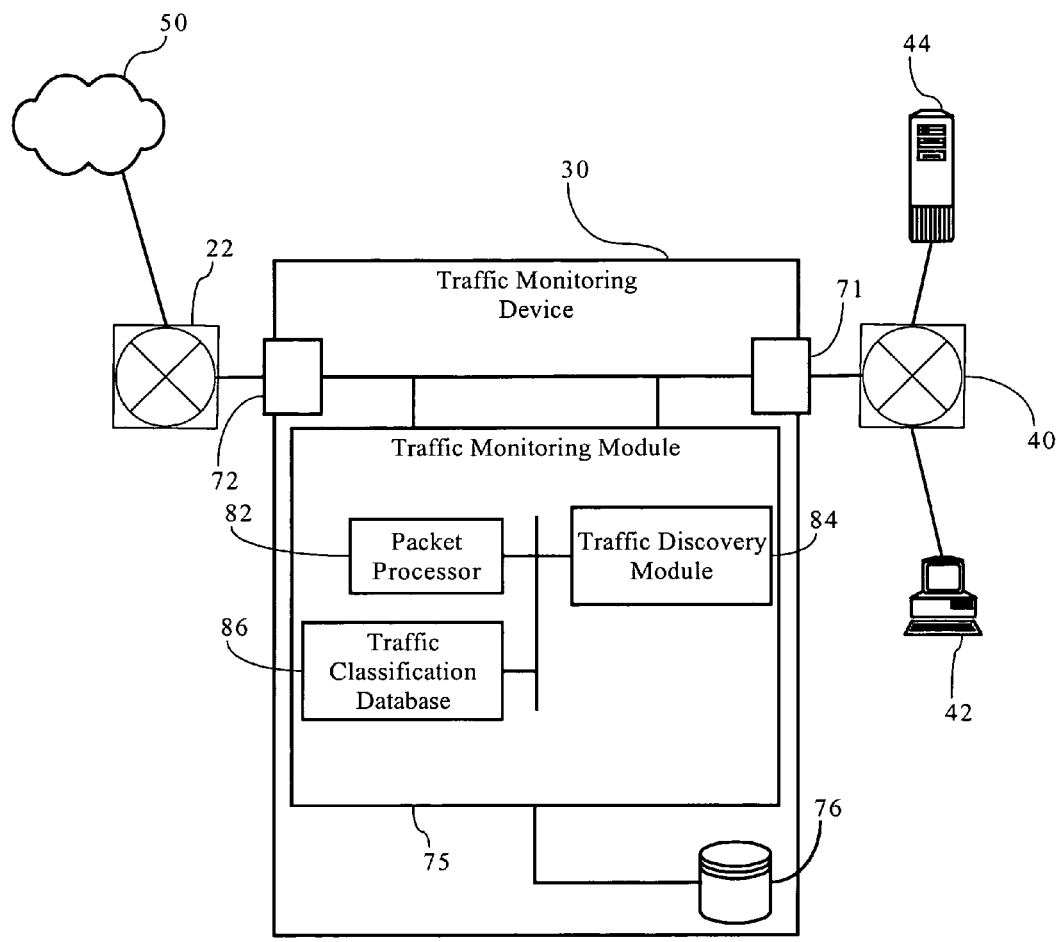
FIG. 1 is a functional block diagram showing a traffic monitoring device according to an embodiment of the present invention.

FIG. 1 illustrates a basic network environment in which an embodiment of the present invention operates. FIG. 1 shows a first network device 40 (such as a hub, switch, router, and/or a variety of combinations of such devices) interconnecting two end-systems (here, client computer 42 and server 44). FIG. 1 also provides a second network device 22, such as a router, operably connected to network cloud 50, which in one implementation could be an open, wide-area network. As FIG. 1 shows, traffic monitoring device 30 comprises traffic monitoring module 75, and first and second network interfaces 71, 72, which operably connect traffic monitoring device 30 to the communications path between first network device 40 and second network device 22. Traffic monitoring module 75 generally refers to the functionality implemented by traffic monitoring device 30. In one embodiment, traffic monitoring module 75 is a combination of hardware and software, such as a central processing unit, memory, a system bus, an operating system and one or more software modules implementing the functionality described herein. In one embodiment, traffic monitoring module 75 includes a packet processor 82, a traffic discovery module 84, and a traffic classification database 86. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics in connection with the flows. The traffic classification database 86, as discussed more fully below, is operative to classify data flows based on one or more attributes associated with the data flows. The traffic discovery module 84 is operative to detect new traffic classes or traffic types in data flows and add the newly discovered traffic classes to the traffic classification database 86, as discussed more fully below, after a threshold or other condition has been satisfied.

The functionality of traffic monitoring device 30 can be integrated into a variety of network devices, such as firewalls, gateways, proxies, packet capture devices (see U.S. application Ser. No. 10/453,345), network traffic monitoring and/or bandwidth management devices, that are typically located at strategic points in computer networks. In one embodiment, first and second network interfaces 71, 72 are implemented as a combination of hardware and software, such as network interface cards and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic monitoring device 30, in one embodiment, includes persistent memory 76, such as a hard disk drive or other suitable memory device, such writable CD, DVD, or tape drives.

Figure 2:
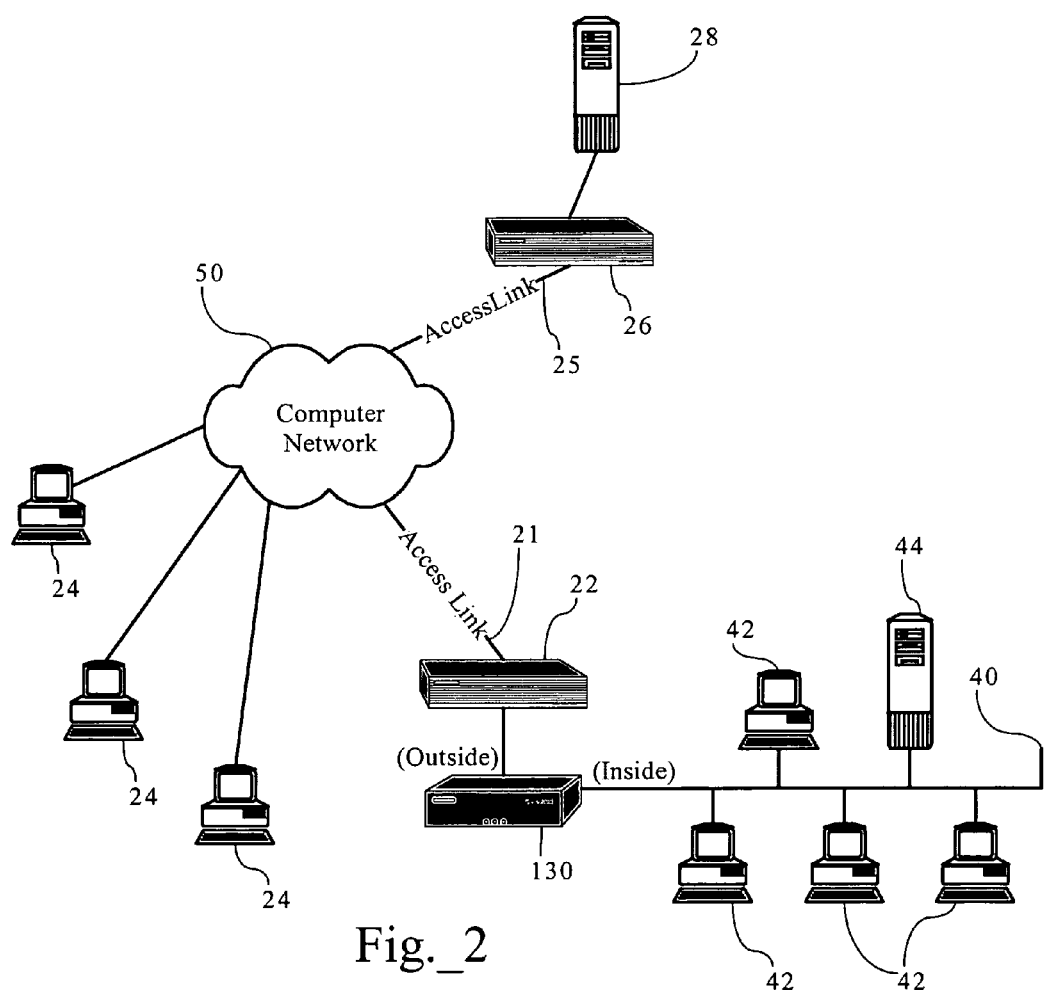
FIG. 2 is a functional block diagram illustrating a computer network environment including a bandwidth management device according to an embodiment of the present invention.

As FIGS. 1 and 2 show, the traffic monitoring device 30 (or bandwidth management device 130), in one embodiment, is disposed on the link between a local area network 40 and router 22. In other embodiments, multiple traffic monitoring devices can be disposed at strategic points in a given network infrastructure to achieve various objectives. In addition, traffic monitoring device 30 need not be directly connected to the link between two network devices, but may also be connected to a mirror port. In addition, the traffic monitoring functionality described herein may be deployed in multiple network devices and used in redundant network topologies by integrating the network traffic synchronization functionality described in U.S. application Ser. No. 10/611,573, incorporated by reference above.

A. Network Traffic Monitoring and Traffic Discovery

As discussed herein, traffic monitoring device 30 is operative to detect or recognize flows between end systems or hosts, and classify the data flows based on one or more flow and/or behavioral attributes. Traffic monitoring device 30 may also monitor and store one or more measurement variables on an aggregate and/or per-traffic-class basis. As discussed above, traffic monitoring device 30 is also operative to identify or discover the traffic classes corresponding to data flows traversing an access link and add them to the traffic classification database 86. As discussed above, traffic discovery allows network administrators to determine the nature of the data flows encountered on a given network. In addition, the tracking of measurement variables (such as total throughput, peak or average bandwidth usage, etc.) allows the network administrator to determine the relative significance of the newly-discovered traffic on bandwidth utilization across the access link.

FIG. 4 illustrates a method, according to an embodiment of the present invention, directed to a flow-aware process that classifies flows and maintains one or more measurement variables based on the identified traffic class. As FIG. 4 illustrates, a packet processor 82 receives a data packet (102) and determines whether a flow object has already been created for the flow to which the data packet is a part (104). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (106). Packet processor 82 then determines whether the received packet is part of an existing flow or a new data flow (108). In one embodiment, flows are generally TCP and UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses (and possibly port numbers) to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (110). For example, the packet processor 82, in one embodiment, increments the packet count associated with the flow (116). If the packet represents a new data flow, traffic classification database 86 operates on the flow object and, potentially, attributes of the packet, such as the payload contents, and other packets associated with the flow to determine a traffic type and/or traffic class associated with the flow (114). In one embodiment, the packet (or a pointer to the packet stored in a buffer structure) and the flow object (or a pointer thereto) is passed to the traffic classification database 86 to determine a traffic class. As discussed in more detail below, identification of a traffic class or type can employ information gleaned from Layers 2 thru 7 of the OSI reference model. The determination of traffic classes is discussed in more detail below at Sections B.1. and B.3. Similarly, if the packet represents a change to the data flow (112), packet processor 82 passes the packet and flow object to the traffic classification database 86 to determine the traffic class. As FIG. 4 shows, if the data flow does not match an existing traffic class (115), packet processor 82 or traffic classification database 86 flags the packet for traffic discovery (116). In one embodiment, a data flow that does not match an existing traffic class is classified in the "default" traffic class. In one implementation, packet processor 82 or another module then records or updates various measurement variables, such as packet count, byte count, last packet time and the like (118). As discussed above, traffic monitoring device 30 may perform other operations, such as firewall or gateway operations, packet capture operations, and/or bandwidth management functions.

Traffic discovery module 84, in one implementation, operates concurrently with the processing of data flows as described above to discover new traffic classes and add the newly discovered traffic classes to traffic classification database 86. Traffic discovery module 84, in one implementation operates on packets that have been flagged or otherwise associated with a default traffic class. In one implementation, traffic discovery module 84 automatically discovers traffic classes based on the methods and systems described in U.S. Pat. Nos. 6,412,000, 6,457,051, and 6,591,299 (see above). For example, traffic discovery module 84 can monitor data flows in real time to discover traffic classes in the data flows, or store flagged packets and process the stored packets periodically to discover new traffic classes. As discussed in the above-identified patents, traffic discovery module 84 applies one or more discovery thresholds, such as a minimum byte count, flow count, packet count and the like with (or without) respect to a fixed or sliding time window in determining whether to add a newly discovered traffic class to traffic classification database 86. In light of the relationship between the traffic discovery module 84 and traffic classification database 86, prior to a discovery threshold being reached, the data flows for which a matching traffic class has been identified by traffic discovery module 84 remain classified as "unknown" or default.

In one implementation, traffic discovery module 84 automatically adds newly discovered traffic classes to traffic classification database 86, which are presented to the network administrator with manually configured and/or previously discovered traffic classes. In an alternative embodiment, traffic discovery module 84 may save the newly discovered traffic classes in a separate data structure and display them separately to a network administrator. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The network manager may then take some action (e.g., pushing a button) to select the traffic classes she wishes to add to the traffic classification configuration maintained by traffic classification database 86.

FIG. 5 illustrates a process, according to an embodiment of the present invention, directed to initially setting, and periodically updating, one or more traffic discovery thresholds. In one implementation, upon initialization of traffic monitoring device 30 (e.g., start up, reboot, etc.), traffic discovery module 84 sets the initial discovery thresholds to various predetermined or previously-stored values (150). As discussed above, in one implementation, the different discovery thresholds may be applied to different overall traffic types. For example, traffic discovery module 84 can apply a different discovery threshold for non-IP traffic, such as SNA data flows. Traffic discovery module 84 can also apply a different, sometimes higher threshold for traffic destined for various well-known port numbers, such as SMTP, HTTP, etc. Yet another discovery threshold can be applied to data flows associated with applications that make use of dynamic ports, such as the File Transfer Protocol (FTP), or database applications that redirect database clients to the port number of the least-loaded database server instance. Furthermore, in one implementation, one or more of these initial discovery thresholds may be set to a value that depends on, for example, the intended capacity or capabilities of traffic monitoring device 30. For example, the traffic discovery thresholds may be scaled to the intended throughput capacity of traffic monitoring device 30. For example, a traffic monitoring device intended for a high-capacity access link may have higher default discovery thresholds, while a traffic monitoring device intended for a low capacity or low throughput access link may have lower default discovery thresholds. In one implementation, traffic discovery module 84, at initialization, may be configured to check a unit or model identifier to select a corresponding set of default discovery thresholds.

As FIG. 5 illustrates, traffic discovery module 84, in one implementation, then periodically determines whether one or more new traffic discovery thresholds should be computed. In one implementation, traffic discovery thresholds are re-computed at a set time interval (152), such as every fifteen minutes, every hour, every day. However, this time interval can also be a configurable parameter. In one implementation, network administrators may access a configuration interface and manually override one or more discovery thresholds. In one implementation, if the discovery thresholds have been manually overridden (154), traffic discovery module 84 configures the automatic traffic discovery mechanisms described herein to apply the manually configured discovery thresholds (158). Otherwise, traffic discovery module 84 computes one or more new discovery thresholds (156), as described more fully below.

A.1. Computing New Traffic Discovery Thresholds

Traffic discovery module 84 can compute new discovery thresholds based one to a variety of different factors or parameters. For example, one to a combination of the following factors can be used to compute new discovery thresholds: 1) time (t) since automatic traffic discovery was enabled or re-started, 2) rate (r) of new class discovery, 3) total number (n) of flows, and 4) number (u) of non-matching (e.g., unknown/default) flows. For example, if r is decreasing, one implementation could update the discovery thresholds unless u/n (as a percentage) was also increasing. If u/n is increasing, an implementation could adjust one or more thresholds to make automatic traffic discovery more sensitive. In other implementations, it is also possible to include average bps for default traffic and average total bps in calculating the discovery threshold(s). Optionally, some lag can be incorporated into the movement of the discovery threshold(s) by using a moving average mechanism, such as weighted moving averages or exponential weighted moving averages. In one implementation, a scaling factor may be computed and applied to one or more traffic discovery thresholds, as opposed to directly computing new discovery thresholds. Moreover, in implementations involving more than one discovery threshold for different traffic types, the calculation of different discovery thresholds can be separately performed based on analysis of different data or use of different algorithms. The discovery thresholds can also be computed with regard to other factors related to the behavior of traffic discovery, the access link(s), and/or the nature of the network traffic traversing the access links(s).

In one implementation, automatic traffic discovery thresholds can be dynamically adjusted based on the time when automatic traffic discovery was initialized. Assume for didactic purposes, that t is the time in days since automatic traffic discovery was enabled or re-initialized;

$T_i$ is the initial threshold used for automatic traffic discovery; and $T_a$ is the currently active threshold in use for automatic traffic discovery. The pseudocode that follows illustrates one basic possible implementation that changes the thresholds over time. In one implementation, the threshold values correspond to a number of flows associated with a given traffic class over a fixed interval. However, the computations set forth below could easily be applied or modified to compute thresholds expressed in byte counts, packet counts, and the like. According to the implementation described below, the change in thresholds is linear for the first 7 days (of course, any suitable time period can be used, or the time period can be a configurable parameter), and then levels off to a constant value. In the implementation described below, the interval at which discovery thresholds are computed is one day.

```
if (t < 7) {
T_a = (T_i * t);
}
else {
T_a = (T_i * 7);
}
```

In another, more complex implementation, the automatic discovery thresholds can be recomputed on a daily basis using the following equation.

$$T_a = 2^t * T_i$$

In one implementation, an upper limit can be placed on the variable t, as the following pseudocode illustrates. Again, for didactic purposes, assume that N is a constant that could be a configurable parameter, and that ldexp(x,n) is the C <math.h> library function for $x*2^n$.

```
if (t < N) {
T_a = ldexp(T_i, t)
}
else {
T_a = ldexp(T_i, N);
}
```

In another implementation, the automatic discovery thresholds can be adjusted based on the rate of traffic discovery (r) observed over a given time interval. Accordingly, the rate of new class discovery, r, equals the number of new traffic classes discovered over a given time interval. The time interval can range from a minute to a few hours, or even a day. In one implementation, this time interval is equal to the interval at which the automatic discovery thresholds are re-computed. The pseudocode that follows sets forth an implementation that adjusts the applied discovery threshold, $T_a$, based on the rate of new traffic class discovery. Note that the constants ⅞ and ⅛ represent one combination of myriad possible weighting values. In addition, the weighting values can be configured such that $T_a$ always increases over time by using, for example, ⅞ and ¼. Initially, $T_a = T_i$, thereafter:

```
if (r >rate threshold) {
T_a = int[(.875 * T_a) + (.125 * r * T_a)];
}
else {
T_a = int[(.875 * T_a) + (.125 * A * T_a)]
}
```

For didactic purposes assume that A=1; however, A can be a configurable parameter the value of which produces a variety of different behaviors. One skilled in the art will recognize that the rate threshold depends on the time interval employed and can be a configurable parameter, as well. In addition, another implementation can take into consider the value of r over multiple intervals; for example, the movement of $T_a$ could be additionally weighted based on the difference between the rate of discovery over the present interval and the preceding interval.

In another implementation, one or more automatic discovery thresholds may be adjusted based on a comparison of the total number of flows and the number of unknown flows within a given time period. For didactic purposes, assume that 1) n is the total number of flows in a specific time period; 2) u is the number of unknown flows in the specific time period; 3) acceptablePercentage is a ratio that can be set by the user, or can be hard-coded in the system, to specify the maximum acceptable percentage of unknown flows; and 4) adjustRate is a value that controls how $T_a$ is to be adjusted (e.g., gradually, rapidly, etc.—examples of an effective adjustRate would include 2 (rapid adjust) and 0.5 (gradual adjust)). Again, initially $T_a = T_i$; thereafter, $T_a$ is adjusted at each interval according to the following process:

```
percentOfUnknownFlows = u/n;
if (percentOfUnknownFlows >= acceptablePercentage) {
// decrease thresholds
T_a = int(T_a - (( adjustRate * (percentOfUnknownFlows)) *
   T_a);
}
else {
//increase thresholds
T_a = int( T_a + (( adjustRate * (percentofUnknownFlows)) *
   T_a);}
```

Of course, the foregoing implementations illustrate only a few of a variety of possible implementations. Other factors can be incorporated into the threshold adjustment computations, such as: 1) the total number of identified packets vs. the total number of unidentified packets; 2) the total volume (in terms of kbytes) of known traffic vs unknown traffic; 3) the volume of known traffic vs unknown traffic, during a certain period of day (e.g., 9 am to 5 pm); 4) the total number of discoverable classes; 5) whether the services available to be auto-discovered have been dynamically modified (e.g., adjusting thresholds when a plug-in is added); 6) the peak bits-per-second (bps) of the unknown traffic relative to the peak bps of the known traffic; and 7) the number of class hits of unknown traffic vs. the number of class hits of known traffic.

B. Integration of Traffic Discovery into Bandwidth Management Devices

As discussed above, the traffic monitoring and discovery functionality described above, in one embodiment, can be integrated into a bandwidth management device 130 operative to manage data flows traversing access link 21. The above-identified, commonly-owned patents and patent applications disclose the functionality and operation of bandwidth management devices. FIG. 2 sets forth a packet-based computer network environment including a bandwidth management device 130. As FIG. 2 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 130 is provided between router 22 and local area computer network 40. Bandwidth management device 130 is operative to classify data flows and, depending on the classification, enforce respective bandwidth utilization controls on the data flows to control bandwidth utilization across and optimize network application performance across access link 21.

Figure 3:
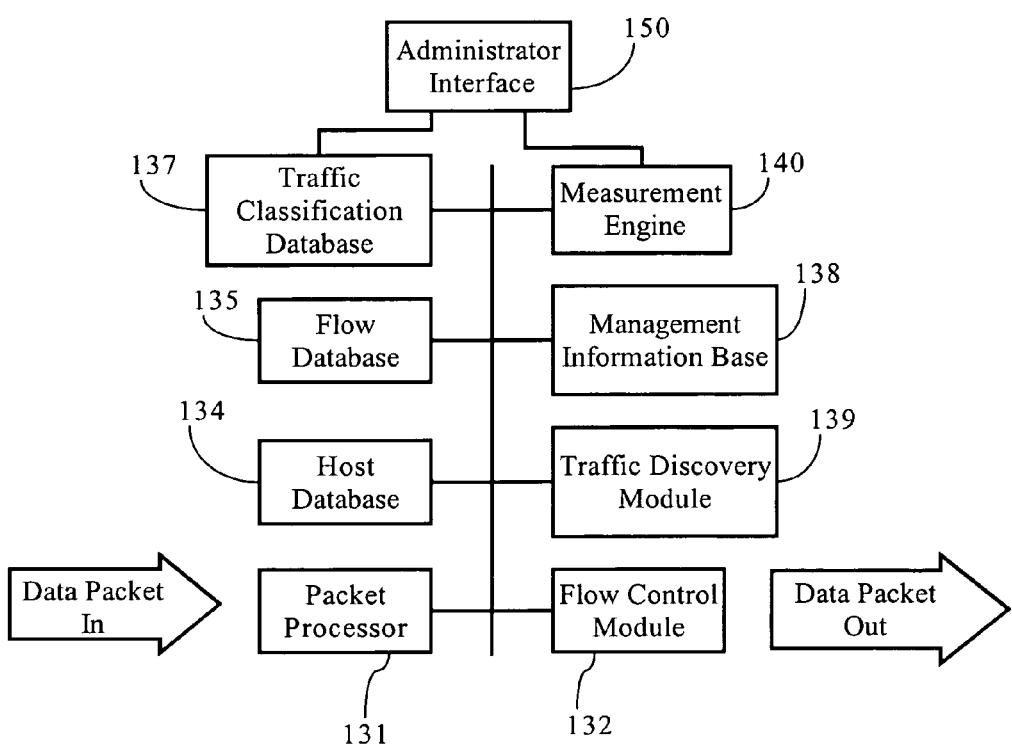
FIG. 3 is a functional block diagram setting forth the functionality in a bandwidth management device according to an embodiment of the present invention.

FIG. 3 is a block diagram illustrating functionality, according to one embodiment of the present invention, included in bandwidth management device 130. In one embodiment, bandwidth management device 130 comprises packet processor 131, flow control module 132, measurement engine 140, traffic classification engine 137, management information base (MIB) 138, traffic discovery module 139, and administrator interface 150. Packet processor 131 is operative to detect new data flows and construct data structures including attributes characterizing the data flow. Flow control module 132 is operative to enforce bandwidth utilization controls on data flows traversing bandwidth management device 130. Traffic classification engine 137 is operative to analyze data flow attributes and identify traffic classes corresponding to the data flows, as discussed more fully below. In one embodiment, traffic classification engine 137, in one implementation, stores traffic classes associated with data flows encountered during operation of bandwidth management device 130, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 130. Traffic discovery module 139 is operative to automatically discover traffic classes based on examination of one or more attributes of the data flows traversing bandwidth management device 130, as discussed above. Measurement engine 140 maintains measurement data relating to operation of bandwidth management device 130 to allow for monitoring of bandwidth utilization across access link 21 with respect to a plurality of bandwidth utilization and other network statistics on an aggregate and/or per-traffic-class level. Bandwidth management device 130, in one embodiment, further includes a persistent data store (not shown), such as a hard disk drive, for non-volatile storage of data.

Administrator interface 150 facilitates the configuration of bandwidth management device 130 to adjust or change operational and configuration parameters associated with the device. For example, administrator interface 150 allows administrators to select identified traffic classes and associate them with bandwidth utilization controls (e.g., a partition, a policy, etc.). Administrator interface 150 also displays various views associated with a hierarchical traffic classification scheme and allows administrators to configure or revise the hierarchical traffic classification scheme. Administrator interface 150 also allows a network administrator to view current traffic discovery threshold values and to manually override one or more of these values. Administrator interface 150 can be a command line interface or a graphical user interface accessible, for example, through a conventional browser on client device 42.

B.1. Packet Processing

In one embodiment, when packet processor 131 encounters a new data flow it stores the source and destination IP addresses contained in the packet headers in host database 134. Packet processor 131 further constructs a control block (flow) object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 131, in one embodiment, reserves memory space in the dynamic memory pool for storing such variably-sized attribute information as flows traverse bandwidth management device 130. Packet processor 131 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 2 illustrates the concept associated with inside and outside addresses. As discussed above, in one embodiment, a flow specification object includes an "inside" and "outside" address relative to bandwidth management device 130. See FIG. 2. For a TCP/IP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow. As discussed above, in one embodiment, the control block object attributes further include a packet count corresponding to the number of packets associated with the flow to allow for such operations as the application of policies based on packet counts.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 130 encounters a new flow, packet processor 131 analyzes the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

B.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, bandwidth management device 130 includes functionality allowing for classification of network traffic based on information from layers 2 to 7 of the OSI reference model.

Bandwidth management device 130, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees. In one embodiment, traffic classification database 137 also stores traffic classes added by traffic discovery module 139.

Traffic classification database 137 stores traffic classes associated with data flows that traverse access link 21. Traffic classification database 137, in one embodiment, stores the traffic classes and corresponding data (e.g., matching rules, policies, partition pointers, etc.) related to each traffic class in a hierarchical tree. This tree is organized to show parent-child retationships—that is, a particular traffic class may have one or more subordinate child traffic classes with more specific characteristics (matching rules) than the parent class. For example, at one level a traffic class may be configured to define a particular user group or subnet, white additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/DefauLt". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification database 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.3.a. Automatic Traffic Classification

As discussed above, traffic discovery module 139, in one implementation, analyzes data flows for which no matching traffic class was found in traffic classification database 137. Traffic discovery module 139, in one embodiment, is operative to apply predefined sets of matching rules to identify a traffic class corresponding to non-matching data flows. In one implementation, traffic discovery module operates on data flows classified as either /Inbound/Default or Outbound/Default. In one embodiment, traffic discovery module 139 is configured to include a predefined set of traffic classes based upon a knowledge base gleaned from observation of common or known traffic types on current networks. In one embodiment, traffic discovery module 139 creates traffic classes automatically in response to data flows traversing bandwidth management device 130 and stores such traffic classes in traffic classification database 137. Automatic traffic classification is disclosed in U.S. Pat. Nos. 6,412,000, 6,457,051, and 6,591,299, which are incorporated herein by reference.

As discussed above, traffic discovery module 139 applies one or more traffic discovery thresholds when deciding whether to present or add newly discovered traffic classes. In one embodiment, traffic discovery module 139 must detect a minimum number of data flows within a predefined period for a given traffic type before it creates a traffic class in traffic classification database 137. In one embodiment, auto-discovered traffic classes are automatically assigned predefined bandwidth utilization controls. U.S. patent application Ser. No. 09/198,051, incorporated by reference herein, discloses automatic assignment of bandwidth utilization controls for discovered traffic classes. Furthermore, as discussed above, traffic discovery module 139 is operative to dynamically adjust one or more traffic discovery thresholds depending on at least one observed parameter or attribute, such as time, or the rate of discovering new traffic classes relative to the number of data flows, etc.

B.4. Measurement Engine

As discussed above, measurement engine 140 maintains data associated with the operation of bandwidth management device 30 and access link 21, including data allowing for measurement of bandwidth utilization across access link 21 with respect to a plurality of bandwidth utilization and other network statistics. In one implementation, measurement engine 140 is operative to record or maintain numeric totals of a particular measurement variable at periodic intervals on a traffic classification basis. For example, measurement engine 140 monitors the number of inbound and outbound packets, the number of flows, peak and average rates, as well as the number of bytes, traversing bandwidth management device 30 on an aggregate (access link), partition, and/or traffic class level. Other network statistics can include the number of TCP packets, the number of retransmitted TCP packets, the peak number of concurrently active TCP flows or other connections, etc. Measurement engine 140 also maintains data relating to operation of bandwidth management device 30, such as the number of partitions, the byte count in a given partition, the packet count in a given partition, the TCP data packet count in a given partition, the TCP retransmit packet count in a given partition, the TCP tossed retransmit packet count in a given partition, the peak number of active TCP flows in the partition, the total time in seconds spent over the partition size for the partition. Measurement engine 140 further maintains data relating to traffic classes, such as, for a given traffic class: the packet count in the traffic class, the TCP data packet count in the class, the TCP retransmit packet count in the class, and the peak number of active TCP flows in the class, as well as a "class hits" count characterizing the number of flows that were matched to a given traffic class. Of course, measurement engine 140 can be configured to record and maintain a variety of network utilization and performance related data.

In one embodiment, measurement engine 140 monitors operation of bandwidth management device 30 and maintains values (e.g., packet counts, peak bandwidth utilization values, and other quantities) for various network operation, utilization and performance statistics. In one embodiment, measurement engine 140 maintains such values in volatile memory and, at periodic intervals, stores the data in persistent memory, such as a hard drive, with a time stamp and clears the network statistic values in the volatile memory space. As discussed above, network statistic data can be stored in association with identifiers for access link 21, as well as for various partitions and traffic classes associated with the current configuration of bandwidth management device 30. In one embodiment, measurement engine 140 stores network statistic data in persistent memory at one-minute intervals; however, other suitable time intervals can be chosen as a matter of engineering design or administrative need. In addition, the persistent memory, in one embodiment, includes sufficient capacity to store a large amount of network management data, such as data for a period of 24, 48, or 72 hours.

In one embodiment, the time interval at which measurement engine 140 stores network management data in persistent memory is a configurable parameter. Additionally, measurement engine 140 includes APIs allowing other modules to access the raw measurement data. In one embodiment, measurement engine 140 includes APIs and associated functionality that aggregates raw measurement data over specified time intervals (e.g., the last hour, 15 minutes, day, etc.).

B.5. Enforcement of Bandwidth Utilization Controls

FIG. 6 illustrates a method, according to one embodiment of the present invention, directed to the enforcement of bandwidth utilization controls on data flows transmitted across access link 21 and, therefore, traversing bandwidth management device 130. The method for enforcing bandwidth utilization controls, however, is not critical to the present invention; any suitable method can be employed.

In one embodiment, packet processor 131 receives a data packet (FIG. 6, 202) and determines whether flow database 135 contains an existing control block object corresponding to the data flow (204) (see Section B.1., supra). If no control block object corresponds to the data packet, packet processor 131 constructs a control block object including attributes characterizing the data flow, such as source address, destination address, service type, etc. (212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 6 illustrates, packet processor 131 then determines whether the received packet is part of a new data flow (208) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses (and possibly port numbers) to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In one embodiment, if the last packet time does exceed a threshold, this signals to the packet processor 131 that the previous flow has terminated, causing the packet processor 131 to notify FDR emitter 139. In another embodiment, a separate process monitors the last packet times associated with UDP, GRE and similar flow types to detect termination of a given flow. In some embodiments, packet processor 131 may have to encounter multiple packets to identify and fully characterize a new data flow (e.g., identify a service type, traffic class, etc.). For example, U.S. Pat. No. 6,046,980 and U.S. Pat. No. 6,591,299, identified above, discloses methods for classifying packet network flows.

If the data packet does not signify a new data flow, packet processor 131 retrieves the control block object, and associates the packet with the control block object (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object, (and potentially on the packet stored in the buffer structure) to identify traffic class(es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes (216). As discussed above, if the data flow does not match an existing traffic class (219), packet processor 82 or traffic classification database 137 flags the packet for traffic discovery module 139 (220). In one embodiment, a data flow that does not match an existing traffic class is classified in the default traffic class. Traffic discovery module 139 operates on attributes of the data flow to classify it as discussed above. If the identified traffic class exceeds a discovery threshold, traffic discovery module 139, in one implementation, adds the discovered traffic class to traffic classification database 137. In one implementation, traffic discovery module 139 also writes default bandwidth utilization controls and/or other policies (such as security or redirection policies) into traffic classification database 137. In another embodiment, newly discovered traffic classes can be added to a separate list, or other data structure, from which a network administrator may elect to add to the traffic classification configuration maintained by traffic classification database 137.

Packet processor 131 then passes the packet to rate control module 132 (222) which accesses the control block object corresponding to the data flow to retrieve the bandwidth utilization or other controls (e.g., partition, policy, security controls, etc.) associated with the traffic class and enforces the bandwidth utilization controls on the data packet flow. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. As FIG. 6 illustrates, packet processor 131 also records or updates various measurement values in the control block object that characterize the flow (e.g., last packet time, packet count, byte count, etc.) (224). In addition, measurement engine 140, in one embodiment, records data associated with the packet to allow for analysis of bandwidth utilization and other network statistics on a traffic class, access link, and/or partition level.

C. Additional Automatic Traffic Discovery Functions

As discussed below, bandwidth management device 30 may also include other user-configurable functionality to tailor operation of, and thereby enhance, the usability of the automatic traffic discovery module 139.

C.1. "Class-Kill" Command

In one implementation, the automatic traffic discovery function allows users to select certain traffic classes and prevent them from being automatically discovered and reappearing in the traffic classification configuration. As discussed above, the administrator interface 150 allows users to delete traffic classes in the traffic classification database 137. However, if there is active traffic for a deleted traffic class, the automatic traffic discovery module 139 will automatically discover the traffic class and, again, add it to the traffic classification database. To address this circumstance, the administrator interface 150 offers the "class kill" command which deletes a selected traffic class from the traffic classification database 137 and prevents traffic discovery module 139 from discovering the class again. In one implementation, execution of a class kilt command essentially removes the traffic class and associated matching attributes from the configuration of the traffic discovery module 139. In one implementation, the administrator interface 150 allows users to view a list of "killed" traffic classes and reinsert them into the configuration of the traffic discovery module 139.

In another implementation, administrator interface 150 includes an automatic traffic discovery configuration page that allows users to tag specific traffic classes or services, or clusters/groups of related services, that should not be automatically discovered. For example, a network administrator for an enterprise that runs SAP software on its network, may want to tag all other ERP applications and services as "non-discoverable," since the network will not be likely to encounter it. This configuration prevents false positives, and improves the efficiency of traffic discovery as it is tailored to an enterprise's network.

C.2. Automatic Traffic Class Pruning

In one implementation, an automatic traffic class pruning mechanism periodically scans the traffic classification database for inactive or substantially inactive traffic classes and deletes them from the traffic classification database. In one implementation, the traffic class pruning mechanism operates by checking the usage of each traffic class as recorded by various statistics in the measurement engine 140 (see Section B.4., above). As FIG. 7 illustrates, the traffic class pruning mechanism runs automatically at periodic intervals to "prune" the traffic classification configuration hierarchy stored in traffic classification database 137 and remove those traffic classes such that the tree reflects currently active traffic. In one implementation, the administrator interface 150 permits the user to turn auto-pruning off and on, to force a prune of the tree, and to set thresholds for what traffic classes should be pruned and when, or how often, pruning should occur. In one implementation, the decision to prune a given traffic class is made with respective to one or more configurable thresholds that define an "inactive" traffic class. For example, in one implementation, inactive traffic classes can be defined by one to a combination of the number of flows (n) and peak rate (p) over a given time interval (T).

FIG. 7 illustrates a method directed to automatically pruning the traffic classification database 137. As FIG. 7 shows, the traffic class pruning mechanism, in one implementation, operates at periodic intervals. According, when it is time to prune the traffic classification database 137 (302), the traffic class pruning mechanism retrieves the pruning configuration parameters (e.g., usage thresholds, traffic classes excluded from pruning, etc.) (304), and access traffic classification database 137. In one implementation, the traffic class pruning mechanism, for all traffic classes in the database 137 (306), first determines whether the traffic class was manually created (308). If so, the traffic class is not pruned from traffic classification database 137. The traffic class pruning mechanism then determines whether the traffic class has met the minimum usage threshold (310). As discussed above, the traffic class pruning mechanism, in one implementation, access the measurement engine 140 to obtain relevant usage statistics over a given time interval and assesses the recorded usage against one or more configured thresholds. If the traffic class does not meet the minimum usage threshold, it is deemed to be inactive and deleted from traffic classification database 137 (312). In this manner, the network administrator is presented with only currently active traffic classes when access the administrator interface 150 to gain insight into the current state of the network.

C.3. Auto-Discovery Service Characteristics

In one implementation, traffic discovery module 139 allows for the capture of certain characteristics or attributes related to auto-discovery of traffic classes. In one implementation, traffic discovery module 139, when it creates a traffic class in traffic classification database, creates a meta data file detailing when and why the traffic class was autodiscovered, including time and date of class discovery, source IP addresses, source ports, destination IP addresses, destination ports, etc. Tagging services with information about what caused them to be autodiscovered, and when, provides accountability and time stamping for class creation, and also provides a degree of the anomaly detection that's more specifically called out in the NewDiscoveries feature.

C.4. Discovery Limits

When autodiscovery is enabled, traffic discovery module 139, in one implementation, continues to discover classes until there is no more new traffic or there is no more memory space available for new classes within the traffic classification database. Accordingly, in one implementation, traffic discovery module 139 is configured with absolute discovery limits, either on all of traffic discovery, or on specific subclasses, defining the maximum number of traffic classes that can be discovered. One possible use of the discovery limit, for example, is to limit the traffic classification configuration in the database 137 to x−y classes, where x is the total number of classes available, and y is a variable set by the user. In one implementation, when the discovery limit (x−y) classes is reached, traffic discovery module 139 terminates traffic discovery and provides a warning dialog to notify the user that the discovery limit has been met.

C.5. New Discoveries Interface and Anomaly Detection

In one embodiment, auto-discovered traffic classes are, attached to or associated with either an "/inbound/newlydiscovered/" or "/outbound/newlydiscovered/" bandwidth control category, as appropriate. As discussed below, administrator interface 150 allows for configuration of bandwidth controls for auto-discovered traffic classes. Without this category or conceptual separation, detection of newly discovered traffic classes would be quite difficult in situations where the traffic classification configuration stored in traffic classification database 137 is quite large. That is, newly discovered traffic classes would essentially blend into the large number of pre-existing classes. This also facilitates post-discovery uses of automatic traffic discovery, such as allowing network administrators to quickly discern what traffic classes have been recently discovered and their effect on bandwidth utilization across an access link.

Once the new classes are in the NewDiscoveries section of the traffic classification configuration, the network administrator can then select individual items from that section, and a NewDiscoveries page/window will appear. From this window, the administrator can select from a variety of options in that window: delete this class and have it never rediscover (class kill); move this traffic class into the regular portion of the traffic classification configuration; apply a suggested rate policy; apply a partition or dynamic partitions, etc. Traffic discovery module 139 can also issue an alert indicating when traffic classes are discovered into the NewDiscoveries area of the traffic class configuration to alert the administrator to a new type of traffic on the network. In one implementation, thresholds can be configured for the NewDiscoveries section that control transmission of alerts, such as sending an alert to the administrator if any class in the NewDiscoveries section consumes over 5% of total bandwidth for more than 5 minutes.

C.6. Discovered Servers

In one implementation, traffic discovery module 139 discovers servers on the network that generate significant traffic which does not classify as any existing traffic class. In one implementation, traffic discovery module 139 tracks otherwise unknown server traffic by IP address. In one embodiment, a given end system can be identified as a server based on its behavior as detected in the data flows traversing bandwidth management device 30. For example, for TCP connections, the server typically transmits SYN/ACK packets in response to SYN packets. If the unknown server traffic for a given IP address exceeds a specified threshold (e.g., a threshold number of packets, bytes, flows, etc.), traffic discovery module 139 adds the end system (identified by its IP address) as a child traffic class to the parent Discovered Server traffic class. For example, if a end-system is running an as-yet unclassified Peer-to-Peer application and is consuming over a certain amount of the network resources, it would be placed in the DiscoveredServer traffic class and presented to a network administrator for inspection. As one skilled in the art will recognize, the Discovered Servers functionality allows a bandwidth management device to automatically pinpoint a server that may be consuming disproportionate amount of bandwidth with an unauthorized application.

FIG. 8 illustrates a process flow directed to discovering servers generating unclassified network traffic. As FIG. 8 illustrates, traffic discovery module 139, in one implementation, inspects packets (340) to track host systems on network 40 (i.e., to the "inside" of bandwidth management device 30, see above), adding new inside hosts to a tracking data structure (342, 344). If the packet is associated with a new flow, traffic discovery module 139 determines whether the inside host behavior is consistent with a server (348). If so, traffic discovery module 139 increments a flow count in the tracking data structure (350). If the flow count exceeds a threshold value (352), traffic discovery module 139 adds the host system (identifying it by IP address) as a child class of the "DiscoveredServers" traffic class (354).

Lastly, although the present invention has been described as operating in connection with end systems and networks primarily employing the HTTP, TCP and IP protocols, the present invention has application in computer network environments employing any suitable session layer, transport layer and network layer protocols. Moreover, one skilled in the art will recognize that the present invention can be applied to dynamically adjust a variety of traffic discovery threshold types, such as flow count, byte count, packet count, and the like. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus facilitating the monitoring of network traffic, comprising:
   one or more network interfaces;
   a memory;
   a processor; and
   computer-executable program code stored in the memory and executable by the processor, the computer-executable program code comprising
   a traffic classification database module comprising computer-executable instructions configured, when executed, to cause the processor to
      store at least one traffic class including a traffic class identifier and at least one attribute defining the traffic class;
      compare attributes stored in association with traffic class identifiers to attributes of a data flow to match a traffic class that corresponds to the data flow;
   a traffic discovery module comprising computer-executable instructions configured, when executed, to cause the processor to
      discover new traffic classes associated with data flows for which the traffic classification database did not find a matching traffic class;
      add discovered traffic classes to the traffic classification database after a discovery threshold has been exceeded;
      dynamically adjust under one or more computer program controls the discovery threshold based on a comparison of a current rate at which the discovered traffic classes are added to the traffic classification database to a threshold rate.

2. An apparatus facilitating the monitoring of network traffic, comprising:
   one or more network interfaces;
   a memory;
   a processor; and
   computer-executable program code stored in the memory and executable by the processor, the computer-executable program code comprising
   a traffic classification database module comprising computer-executable instructions configured, when executed, to cause the processor to
      store at least one traffic class including a traffic class identifier and at least one attribute defining the traffic class;
      compare attributes stored in association with traffic class identifiers to attributes of a data flow to match a traffic class that corresponds to the data flow;
   a traffic discovery module comprising computer-executable instructions configured, when executed, to cause the processor to
      discover new traffic classes associated with data flows for which the traffic classification database did not find a matching traffic class;
      add discovered traffic classes to the traffic classification database after a discovery threshold has been exceeded;
      dynamically adjust under one or more computer program controls the discovery threshold based on an initial value of the discovery threshold and an amount of time since the traffic discovery module was initialized.

3. An apparatus facilitating the monitoring of network traffic, comprising:
   one or more network interfaces;
   a memory;
   a processor; and
   computer-executable program code stored in the memory and executable by the processor, the computer-executable program code comprising
   a traffic classification database module comprising computer-executable instructions configured, when executed, to cause the processor to
      store at least one traffic class including a traffic class identifier and at least one attribute defining the traffic class;
      compare attributes stored in association with traffic class identifiers to attributes of a data flow to match a traffic class that corresponds to the data flow;
   a traffic discovery module comprising computer-executable instructions configured, when executed, to cause the processor to
      discover new traffic classes associated with data flows for which the traffic classification database did not find a matching traffic class;
      add discovered traffic classes to the traffic classification database after a discovery threshold has been exceeded;
      dynamically adjust under one or more computer program controls the discovery threshold based on a comparison of a total number of data flows traversing the apparatus to a total number of data flows unmatched by the traffic classification database.

4. An apparatus facilitating the monitoring of network traffic, comprising:
   one or more network interfaces;
   a memory;
   a processor; and
   computer-executable program code stored in the memory and executable by the processor, the computer-executable program code comprising
   a traffic classification database module comprising computer-executable instructions configured, when executed, to cause the processor to store at least one traffic class including a traffic class identifier and at least one attribute defining the traffic class;

compare attributes stored in association with traffic class identifiers to attributes of a data flow to match a traffic class that corresponds to the data flow;

a traffic discovery module comprising computer-executable instructions configured, when executed, to cause the processor to discover new traffic classes associated with data flows for which the traffic classification database did not find a matching traffic class;

add discovered traffic classes to the traffic classification database after a discovery threshold has been exceeded;

dynamically adjust under one or more computer program controls the discovery threshold based on a comparison of a threshold ratio value to a current ratio between a total number of data flows traversing the apparatus and a total number of data flows unmatched by the traffic classification database.

5. The apparatus of claim 1 further comprising a user interface module comprising computer-executable instructions configured, when executed, to cause the processor to display the traffic classes stored by the traffic classification database.

6. The apparatus of claim 1 further comprising a bandwidth control mechanism configured to enforce bandwidth utilization controls on data flows associated with corresponding traffic classes.

7. The apparatus of claim 1 wherein the traffic discovery module further comprises computer-executable instructions configured, when executed, to cause the processor to monitor the discovery of new traffic classes in relation to a maximum number of discovered traffic classes; and terminate adding discovered traffic classes to the traffic classification database when the maximum number of newly discovered traffic classes has been met.

8. The apparatus of claim 1 further comprising a traffic class pruning module comprising computer-executable instructions configured, when executed, to cause the processor to delete inactive traffic classes added to the traffic classification database by the traffic discovery module.

9. The apparatus of claim 1 further comprising an administrator interface comprising computer-executable instructions configured, when executed, to cause the processor to allow a user to configure the traffic discovery module to prevent selected traffic classes from being added to the traffic classification database.

10. The apparatus of claim 1 wherein the traffic discovery module further comprises computer-executable instructions configured, when executed, to cause the processor to monitor data flows for which the traffic classification database did not find a matching traffic class relative to one or more host systems associated with the network traffic;

identify the host systems behaving as servers in the data flows; and add a traffic class associated with host systems identified as servers in the traffic classification database, if a threshold utilization threshold is exceeded.

11. The apparatus of claim 1 wherein the traffic classification database includes a discovered traffic class section for storing discovered traffic classes added by the traffic discovery module.

12. A method facilitating the monitoring of network traffic, comprising detecting a data flow in network traffic traversing a communications path, the data flows each comprising at least one packet;

parsing at least one packet associated with the data flow into a flow specification, matching the flow specification to a first set of traffic classes, wherein the traffic classes in the first set of traffic classes are each defined by one or more attributes, having found a matching traffic class in the matching step, associating the flow specification corresponding to the data flow with a traffic class from the first set of traffic classes, not having found a matching traffic class in the first set of traffic classes, matching the flow specification to a second set including at least one additional traffic class;

having found a matching traffic class in the second set, updating at least one discovery parameter associated with the matching traffic class, upon a discovery parameter crossing a discovery threshold, adding the corresponding traffic class to the first set of traffic classes; and dynamically adjusting under one or more computer program controls the discovery threshold based on a comparison of a current rate at which the discovered traffic classes are added to the traffic classification database to a threshold rate.

13. The method of claim 12 wherein the flow specification contains at least one instance of any one of the following: a protocol family designation, a direction of packet flow designation, a protocol type designation, a pair of hosts, a pair of ports, a pointer to a MIME type, and a pointer to an application-specific attribute.

14. The method of claim 12 wherein said flow specification contains, and wherein the one or more matching attributes include, at least one instance of any one of the following: a protocol family designation, a direction of packet flow designation, a protocol type designation, a pair of hosts, a pair of ports, a pointer to a MIME type, and a pointer to an application-specific attribute.

15. An apparatus comprising one or more network interfaces;

a memory;

a processor; and computer-executable program code stored in the memory and executable by the processor, the computer-executable program code comprising a packet processor module comprising computer-executable instructions configured, when executed, to cause the processor to detect data flows in network traffic traversing a communications path, the data flows each comprising at least one packet;

parse at least one packet associated with a data flow into a flow specification, a traffic classification database module comprising computer-executable instructions configured, when executed, to cause the processor to match the data flow to a plurality of traffic classes, at least one of the plurality of traffic classes is defined by one or more matching attributes; and a traffic discovery module comprising computer-executable instructions configured, when executed, to cause the processor to discover new traffic classes associated with data flows for which the traffic classification database did not find a matching traffic class;

add newly discovered traffic classes to the traffic classification database after a discovery threshold has been exceeded;

dynamically adjust under one or more computer program controls the discovery threshold based on a comparison of a current rate at which the discovered traffic classes are added to the traffic classification database to a threshold rate.

16. The apparatus of claim 15 wherein said flow specification contains at least one instance of any one of the following: a protocol family designation, a direction of packet flow designation, a protocol type designation, a pair of hosts, a pair of ports, a pointer to a MIME type, and a pointer to an application-specific attribute.

17. The apparatus of claim 15 wherein said flow specification contains, and wherein the one or more matching attributes include, at least one instance of any one of the following: a protocol family designation, a direction of packet flow designation, a protocol type designation, a pair of hosts, a pair of ports, a pointer to a MIME type, and a pointer to an application-specific attribute.

18. The apparatus of claim 15 further comprising
a flow control module operative to apply bandwidth utilization controls to the data flows based on the traffic class associated with the data flows.

19. An apparatus facilitating the monitoring of network traffic, comprising:
one or more network interfaces;
a memory;
a processor; and
computer-executable program code stored in the memory and executable by the processor, the computer-executable program code comprising
a traffic discovery module comprising computer-executable instructions configured, when executed, to cause the processor to
identify traffic classes corresponding to data flows traversing an access link;
monitor bandwidth utilization across the access link with respect to a plurality of traffic classes in relation to at least one bandwidth utilization statistic;
add an identified traffic class to a traffic classification database upon achievement of a minimum bandwidth utilization threshold;
dynamically adjust under one or more computer program controls the minimum bandwidth utilization threshold based on a comparison of a current rate at which the discovered traffic classes are added to the traffic classification database to a threshold rate; and
a user interface module operative to display the traffic classes maintained by the traffic classification database.

20. The apparatus of claim 19 further comprising a bandwidth control mechanism configured to enforce bandwidth utilization controls on data flows associated with corresponding traffic classes.

21. The apparatus of claim 20 wherein the user interface module facilitates association of a bandwidth utilization control to a selected traffic class.

22. The apparatus of claim 19 wherein the minimum bandwidth utilization threshold is a minimum number of data flows.

23. The apparatus of claim 19 wherein the minimum bandwidth utilization threshold is a minimum number of bytes.

24. The apparatus of claim 19 wherein the minimum bandwidth utilization threshold is a minimum number of packets.

25. A method for automatically classifying traffic in a packet communications network, said network having any number of flows, including zero, comprising the steps of:
parsing a packet into a flow specification, wherein said flow specification including at least one attribute;
matching the first flow specification of the parsing step to a plurality of traffic classes, each said traffic class having a traffic specification; thereupon,
if a matching classification tree type node was not found in the matching step,
associating the flow specification with one or more newly-created traffic classes; thereupon,
incorporating said newly-created traffic class into said plurality of traffic classes upon an achievement of a minimum usage threshold; and
dynamically adjusting under one or more computer program controls the minimum usage threshold based on a comparison of a threshold ratio value to a current ratio between a total number of data flows traversing the apparatus and a total number of data flows unmatched by the traffic classification database.

26. The method of claim 25 wherein the plurality of traffic classes is represented by a plurality nodes of a classification tree, each said classification tree node having a traffic specification.

* * * * *